US008387501B2

(12) United States Patent
Jordan et al.

(10) Patent No.: US 8,387,501 B2
(45) Date of Patent: Mar. 5, 2013

(54) METHOD AND APPARATUS FOR RAPID SEVERANCE OF A DECOY TOWLINE

(75) Inventors: James J. Jordan, Nashua, NH (US); Daniel J. Murphy, Dedham, MA (US); Douglas A. Fisher, Jr., Chichester, NH (US); Tyler Forbes, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 801 days.

(21) Appl. No.: 12/384,944

(22) Filed: Apr. 10, 2009

(65) Prior Publication Data

US 2010/0257983 A1 Oct. 14, 2010

(51) Int. Cl.
*B64D 1/02* (2006.01)
*B26D 5/06* (2006.01)

(52) U.S. Cl. ................ 83/586; 83/580; 89/1.14; 89/1.1; 244/147; 244/1 TD; 337/409; 337/416; 219/201

(58) Field of Classification Search ................. 83/639.4, 83/580; 30/DIG. 4, 180, 288, 277, 367; 89/1.14, 89/1.1; 114/221 A; 244/121, 149, 1 TD, 244/147–152; 137/72, 76; 337/195, 407–409, 337/416, 244; 200/61.08; 405/156; 60/635–636; 294/82.24–82.36; 220/89.4; 219/201; 280/743.2
See application file for complete search history.

(56) References Cited

U.S. PATENT DOCUMENTS 1,914,250 A * 6/1933 Gillen ............................. 137/77
2,553,814 A * 5/1951 Dugan .......................... 116/105
2,764,025 A * 9/1956 Otto ................................... 74/2
3,155,800 A * 11/1964 Denton ......................... 337/409
3,393,605 A * 7/1968 Parnell ........................... 89/1.14
3,541,920 A * 11/1970 Gawlick et al. ................ 89/1.14
3,961,481 A * 6/1976 Romanenko et al. ........... 60/531
3,985,321 A * 10/1976 Woolman et al. ............. 244/150
4,026,028 A * 5/1977 Green ............................. 30/233
4,030,061 A * 6/1977 Gaskell et al. ................ 337/409
4,081,964 A * 4/1978 Bendler et al. .................. 60/636
4,267,854 A * 5/1981 Naab et al. ....................... 137/72
4,493,240 A * 1/1985 Norton ........................... 89/1.14
4,587,733 A * 5/1986 Staempfli ........................ 30/278
4,718,320 A 1/1988 Brum
4,852,455 A 8/1989 Brum
5,055,818 A * 10/1991 Bueschel ...................... 337/267
5,177,317 A 1/1993 Walker et al.
5,603,470 A 2/1997 Fitzgerald et al.
5,605,307 A 2/1997 Batchman et al.
5,664,897 A 9/1997 Hennings et al.
6,631,667 B1 10/2003 Chisholm
6,779,796 B2 8/2004 Carlson et al.
6,857,596 B1 2/2005 Carlson
6,886,773 B2 5/2005 Peckham et al.
(Continued)

*Primary Examiner* — Laura M. Lee
(74) *Attorney, Agent, or Firm* — Sand & Sebolt; Michael Sand

(57) ABSTRACT

A method and apparatus for rapidly severing a decoy towline extending from an aircraft by a mechanical spring actuated cutting blade and a thermal fuse type of release mechanism eliminating a pyrotechnic actuation device. The cutting blade is biased toward cutting engagement with the towline by a preloaded coil compression spring retained in the loaded position by a length of a polymer cord. The polymer cord has a heater wire wrapped about a portion of the cord which is connected to a DC voltage supply. The heater wire melts the cords when electrically connected to the DC power supply which releases the restraint on the spring which then drives the cutting blade into severing engagement with the towline.

12 Claims, 8 Drawing Sheets

U.S. PATENT DOCUMENTS 7,178,761 B2 * 2/2007 Wada et al. ............... 244/138 R
7,200,305 B2 4/2007 Dion et al.
7,658,102 B2 * 2/2010 Ohtsuka et al. ............ 73/204.15
8,006,936 B1 * 8/2011 Farr, III ......................... 244/147
2006/0145015 A1 * 7/2006 Preston ......................... 244/149

* cited by examiner

METHOD AND APPARATUS FOR RAPID SEVERANCE OF A DECOY TOWLINE

STATEMENT OF GOVERNMENT INTEREST

The invention was made with United States Government support under Contract No. N00019-03-G-0042/0003 awarded by the United States Navy. The United States Government has certain rights in this invention.

BACKGROUND OF THE INVENTION

1. Technical Field

The invention relates to towed vehicles, and particularly to a method and apparatus for rapidly severing the towline of a decoy in a non-pyrotechnic manner.

2. Background Information

Aerial towed objects are used for a variety of purposes including decoys, targets, testing and scientific investigations. In one embodiment, a decoy is used to draw various types of guided weapons, such as missiles, away from an aircraft that the weapons are intended to destroy. These towed decoys contain various types of electronic circuits to create an apparent target to a weapon, such as a radar or IR guided missile, which attracts the weapon to the decoy rather than the aircraft.

In certain types of such deployment systems, the decoy is intended to be cut loose after it has fulfilled its function, or in other cases of emergency, is cut loose for the protection of the pilot. Heretofore, towline severing mechanisms such as shown in U.S. Pat. Nos. 4,852,455 and 5,603,470 use a small pyrotechnic charge, which when exploded forces a cutting blade into engagement with the towline to sever the towed object from the towing vehicle. Although these pyrotechnic actuated cutters perform satisfactory in most systems, they can provide safety considerations when handling, transporting, during storage, use and disposal since the pyrotechnic devices require hermetic sealing due to degradation of the propellant charge with humidity and high temperature and the harsh environment in which they are used. There are also cost and logistical issues with use of pyrotechnics since the device will have an explosives classification with regulations controlling handling, transport and disposal. Furthermore, incorporation of a pyrotechnic device into a higher-level system can impose explosives regulations on the entire system. All personnel that handle the assembly could be required to have explosives training; storage could be limited to an explosives enclosure or bunker, etc.

Therefore, the need exists for a new method and apparatus which eliminates the need for pyrotechnics in a towline severing or cutting device while retaining the small size of the prior art pyrotechnic cutting devices, yet provide for quick actuation required for an emergency situation when the towed decoy must be separated from the aircraft, and which is tolerant to harsh environmental conditions such as those experienced when used on military aircraft.

Furthermore, the improved cutter or towline severance mechanism or apparatus must be compatible with existing self-test methodology where a spent device can be identified by an open circuit, which can be mass produced relatively inexpensively and is of a rugged and simple construction.

BRIEF SUMMARY OF THE INVENTION

The method and apparatus of the present invention provides for the rapid severance of a towline extending between a towing vehicle and a towed object, such as a decoy tethered to an aircraft, wherein the connecting cable or towline may contain high voltage and fiberoptic conductors to provide radar jamming signals to the decoy for disrupting the flight of a weapon, such as missile being guided to the aircraft by radar or other guidance systems.

Another aspect of the invention is to provide a severing apparatus which is tolerant to harsh environmental conditions experienced by military aircraft, and which is compatible to existing self-test methodology where the spent device can be easily identified by an open circuit.

Still another feature of the invention is to enable the severing mechanism to be housed within a small, rugged outer housing enabled to be fitted within the limited space provided in the decoy deployment housing mounted in the aircraft, and in which the housing keeps the cutting blade captive so there is no safety hazard to personnel and which protects the internal mechanism of the severing apparatus from environmental hazards. The sever device will be subjected to high levels of random vibration, shock, acoustics and a wide range of temperatures typical of military aircraft environment.

Still another feature of the invention is to provide the severing mechanism with a thermal fuse that is sealed within an outer sleeve of plastic and then contained within a rigid outer housing to be free of external influence, and which apparatus is adaptable for use with various configured cutting blades which are chosen to best sever a particular type of the towline, and which requires only the use of a high strength polymer cord to hold a cutting blade compression spring in a loaded position, which cord is easily and quickly melted by the application of electrical power to a small resistance wire coiled about the polymer cord whereby the cutter blade develops energy as a function of the spring force and distance traveled prior to severing impact with the cable.

These features and advantages are obtained by the severing apparatus of the present invention, the general nature of which may be stated as including a housing; a cutting blade mounted in the housing and moveable from a retracted position into an extended cutting engagement position with the cable; a spring biasing the cutting blade toward the cutting engagement position with the cable; and a release mechanism for maintaining the cutting blade in the retracted position and then for releasing the cutting blade for movement into the cutting engagement position with the cable, said release mechanism including a meltable cord operatively connected to the cutting blade for maintaining the cutting blade in the retracted position and a heat source communicating with the cord for separating the cord by melting the cord whereupon the biasing force of the spring moves the blade into cutting engagement with the cable to sever the cable and release the towed object from the towing vehicle.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 9 is a partially exploded perspective view of a modified cutting blade.

Similar numbers refer to similar parts throughout the drawings.

DETAILED DESCRIPTION OF THE INVENTION

Figure 1:
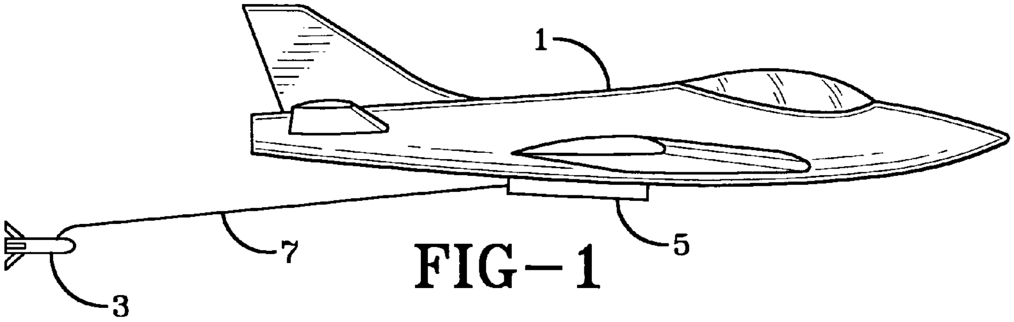
FIG. 1 is a diagrammatic view of an aircraft with a decoy being connected to the aircraft by a towline.

FIG. 1 illustrates one type of aircraft indicated at 1, which utilizes a decoy 3 connected to a decoy deployment apparatus 5 by a towline or towing cable 7. Deployment apparatus 5 may be of various constructions, some examples of which are shown in U.S. Pat. Nos. 6,779,796, 6,857,596 and 6,886,773, the contents of which are incorporated herein by reference. Deployment apparatus 5 can have various features and may be of the type which contains a mechanism for retracting the deployed decoy 3 back into the deployment apparatus, or can contain a pyrotechnic cutting mechanism for severing towline 7 after the decoy has been deployed, or in the case of emergency, when retraction of the decoy back into deployment apparatus 5 is not desirable.

Figure 2:
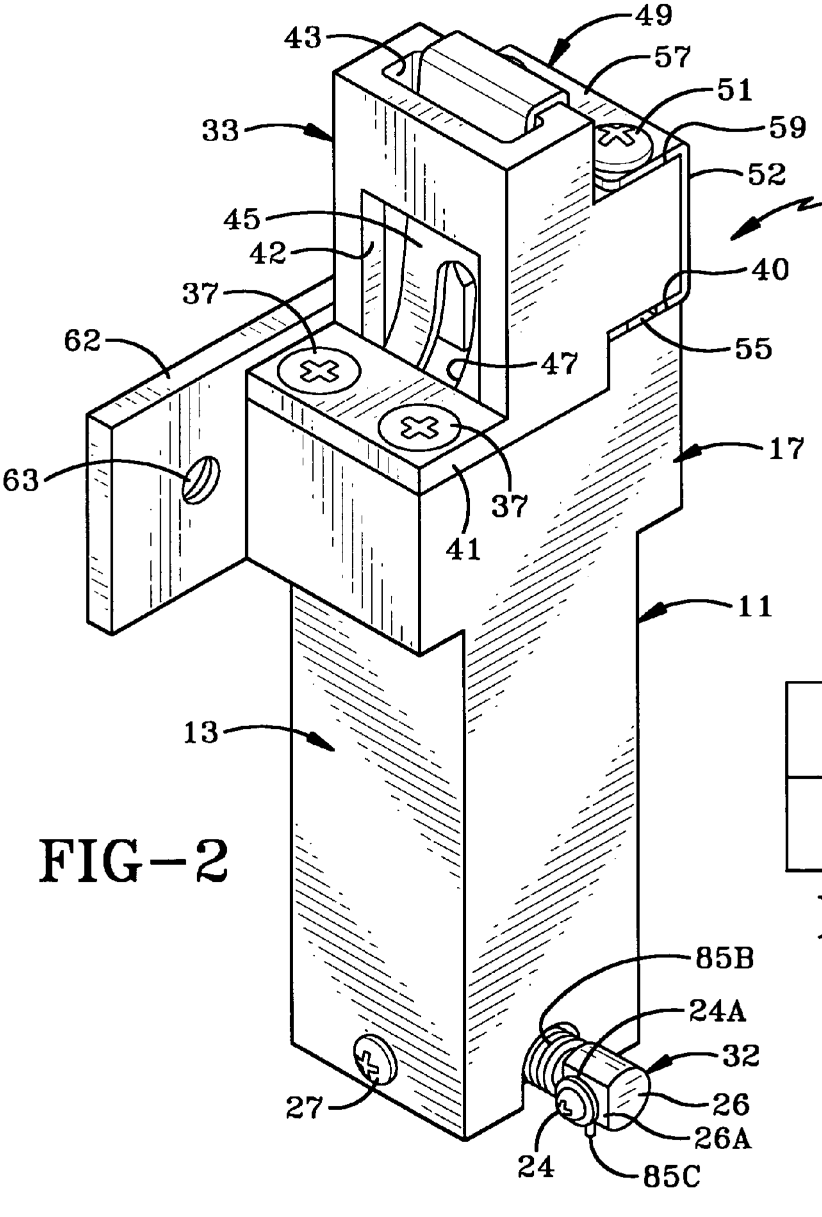
FIG. 2 is a perspective view of the severance apparatus of the present invention.
Figure 3:
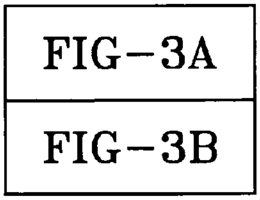
FIG. 3 is a combination of FIGS. 3A and 3B, which are exploded perspective views of the severance apparatus shown assembled in FIG. 2.
Figure 3A:
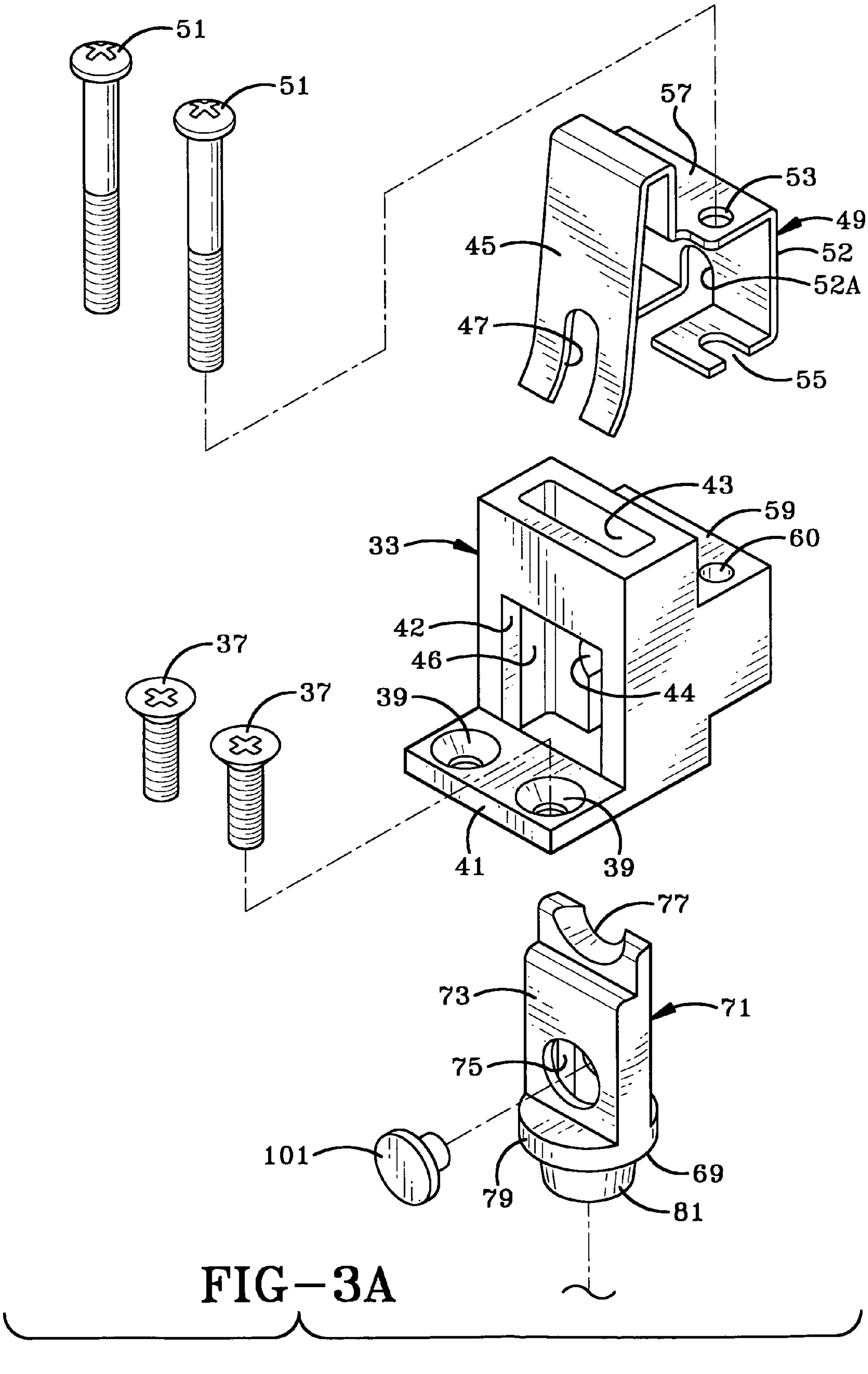
Figure 3B:
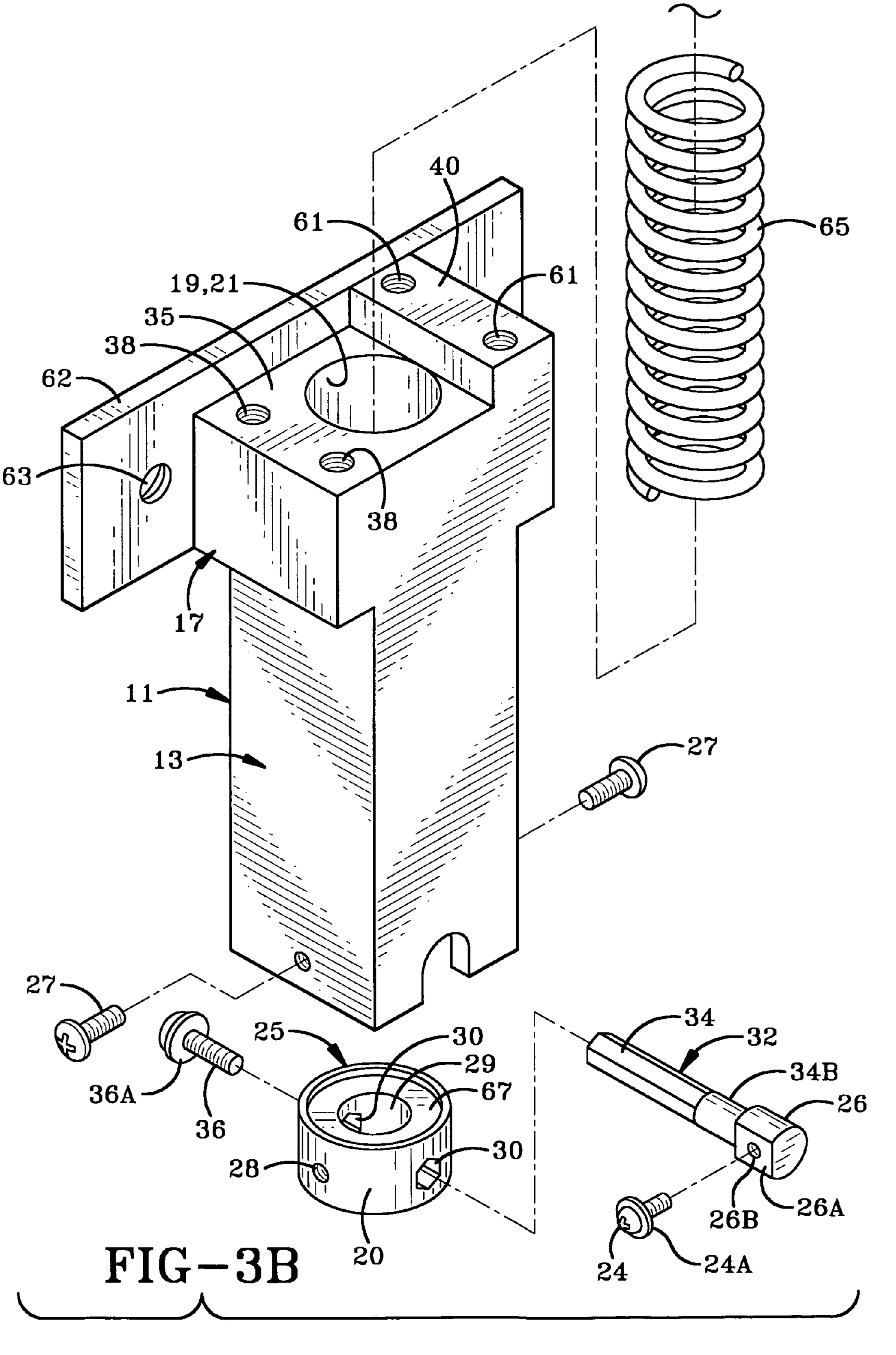
Figure 4:
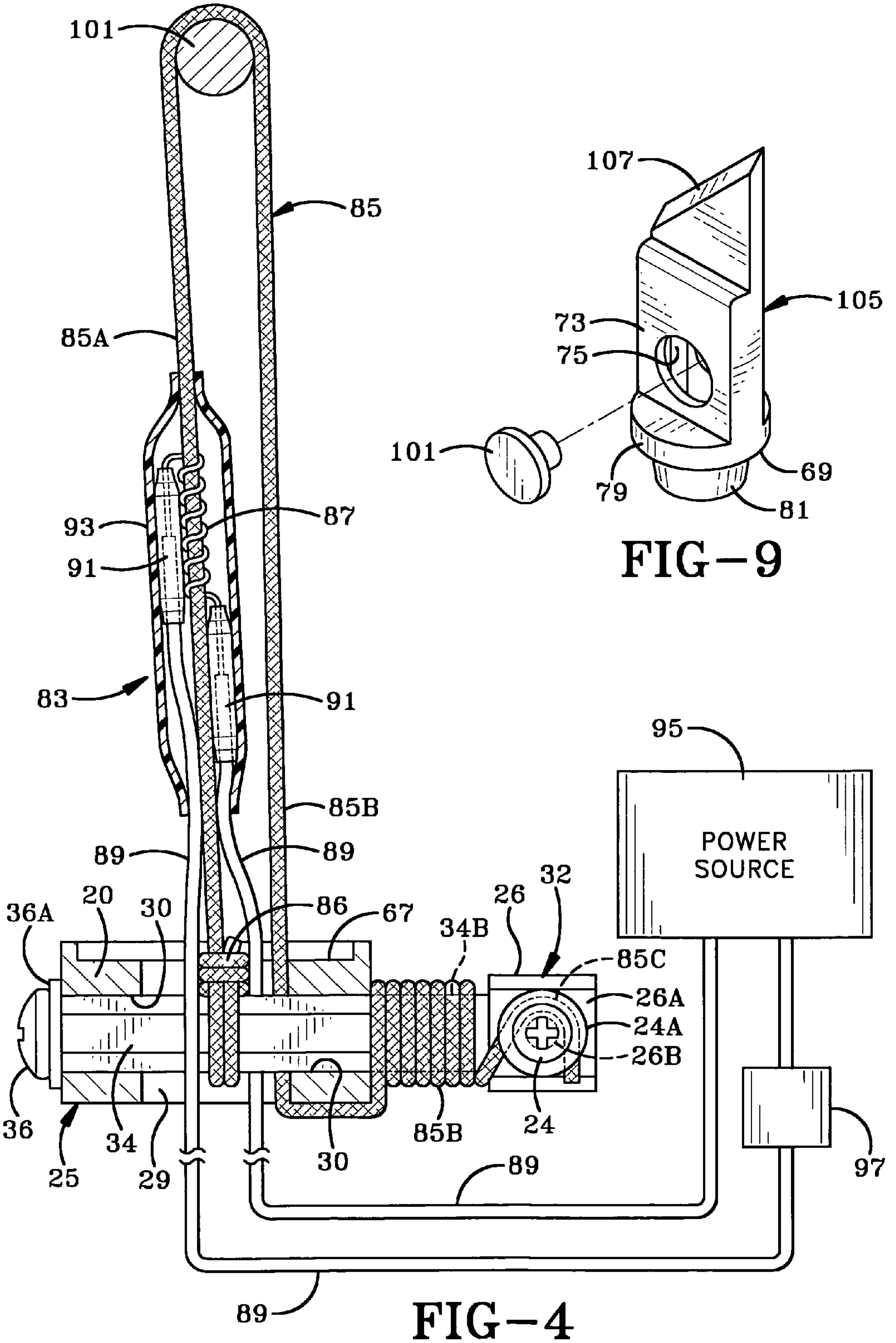
FIG. 4 is an elevational view of the release mechanism removed from the housing of the severance apparatus of FIG. 2.
Figure 5:
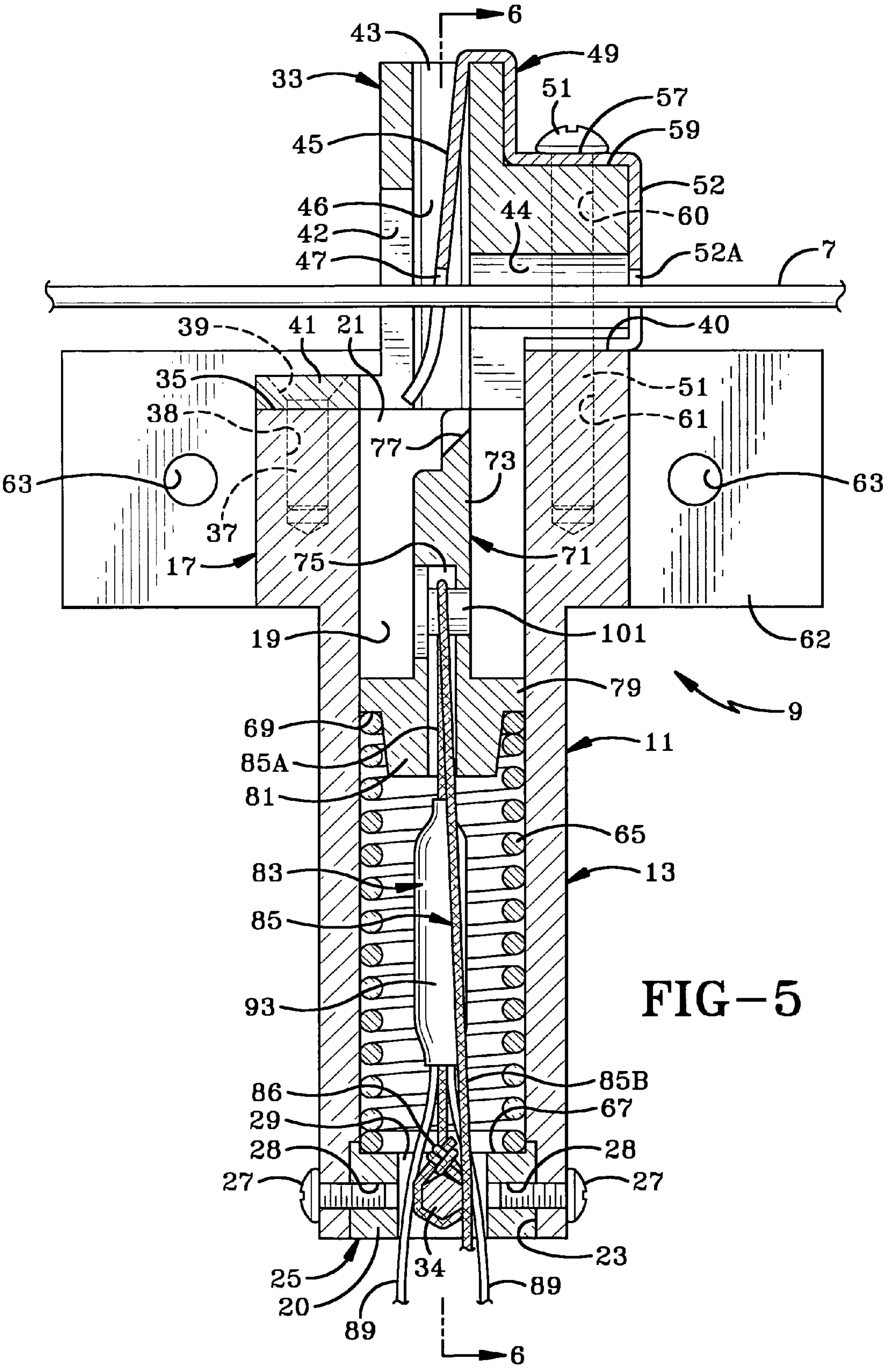
FIG. 5 is a sectional view of the severance apparatus of FIG. 2 in a loaded operational position with a towline.

The severance apparatus of the present invention is indicated generally at 9, and is shown in an assembled position in FIG. 2, and in an exploded condition in FIGS. 3A and 3B. Apparatus 9 includes an outer housing indicated generally at 11, which includes a main rectangular-shaped body 13 and an enlarged rectangular-shaped top portion 17. Main body 13 is formed with a hollow cylindrical bore 19 which extends completely through body 13 and terminates in top and bottom openings 21 and 23, respectively. A bottom end closure member 25 (FIG. 3B) is secured within bottom opening 23 by a pair of bolts 27 which threadedly engage holes 28 formed in a cylindrical sidewall 20 of closure member 25. Bottom closure member 25 has a diameter complementary to that of bore 19 as shown in FIG. 5, and has a central opening or bore 29 and is formed with a pair of diametrically aligned hexagonal-shaped holes 30 in which is mounted a complementary-shaped shaft 34 of a capstan bolt 32. Capstan bolt 32 is secured in holes 30 by a bolt 36 and washer 36A (FIGS. 3B and 4). Capstan bolt 32 terminates at the opposite end from shaft 34 in a smooth shaft portion 34B and an enlarged head 26 formed with a flat surface 26A having a threaded hole 26B for receiving a bolt 24 and a clamping washer 24A, the functions of which are discussed below.

A top housing cap indicated generally at 33 (FIGS. 2 and 3A), is secured to top surface 35 of housing top portion 17 by a pair of bolts 37 which extend through tapered holes 39 formed in an outwardly projecting flange 41 of cap 33 and into threaded holes 38 formed in housing portion 17. Housing cap 33 includes a rectangular-shaped top opening 43 which extends through cap 33, a front rectangular-shaped opening 42 and a through rear opening 44 (FIG. 5) which communicate with a hollow interior 46, which provides a passageway for cable 7. A slightly curved lever spring 45 which is formed with a U-shaped notch 47 at its distal end (FIG. 3A), extends through top opening 43 and into the hollow interior 46 of cap 33. Spring lever 45 is an integral portion of a main spring clip indicated generally at 49, which is mounted on housing cap 33 by a pair of bolts 51 which extend through a pair of holes 53 and lower aligned slots 55 formed in clip 49. Holes 53 are formed in a right angled shoulder portion 57 of spring clip 49 which is seated on a shoulder 59 of top housing cap 33 which is provided with through holes 60 for passage of bolts 51 therethrough. The threaded ends of bolts 51 are received in threaded holes 61 formed in shoulder 40 of housing portion 17 (FIGS. 3B and 5). A U-shaped notch 52A is formed in rear wall 52 of spring clip 49 for the passage of towline 7 therethrough.

Thus, when assembling severing apparatus 9, spring clip 49 is secured to housing cap 33 with spring lever 45 being inserted through rectangular-shaped top opening 43 and located within hollow interior 46 and secured thereon by bolt 51, with top cap 33 being further secured to housing 13 by bolts 37. A mounting bracket 62 preferably will be secured by various types of fasteners (not shown) or welding to a side surface of housing top portion 17 and can be provided with a plurality of holes 63 for mounting severance apparatus 9 to a desired location within the aircraft, and preferably within the deployment apparatus 5.

A coil compression spring 65 having an outer diameter generally complementary to the inner diameter of housing bore 19, is slidably received within the bore and rests upon an annular top ledge 67 of end member 25 (FIG. 5). The other end of spring 65 is butted against an annular shoulder 69 of a cutting blade indicated generally at 71 (FIGS. 3A and 5). Cutting blade 71 preferably includes a rectangular shaft 73 formed with a through opening 75 and terminates at one end in a cutting edge 77 and at the opposite end in an annular base 79. Base 79 has a downwardly extending conical portion 81 which forms shoulder 69 with base 79. In one embodiment, cutting edge 77 has a concave configuration as shown in FIG. 3A but can have various configurations without affecting the concept of the present invention.

The term “compression spring” as used herein can be any strained mechanical element wherein when released the strain energy is converted to kinetic energy of the cutter blade assembly. Spring 65 could be a leaf spring, a stack of Belleville washers, a helical wave spring, or a compressed rubber column. The configuration of the spring element is dependant on the packaging volume restriction of the end use application.

Figure 7:
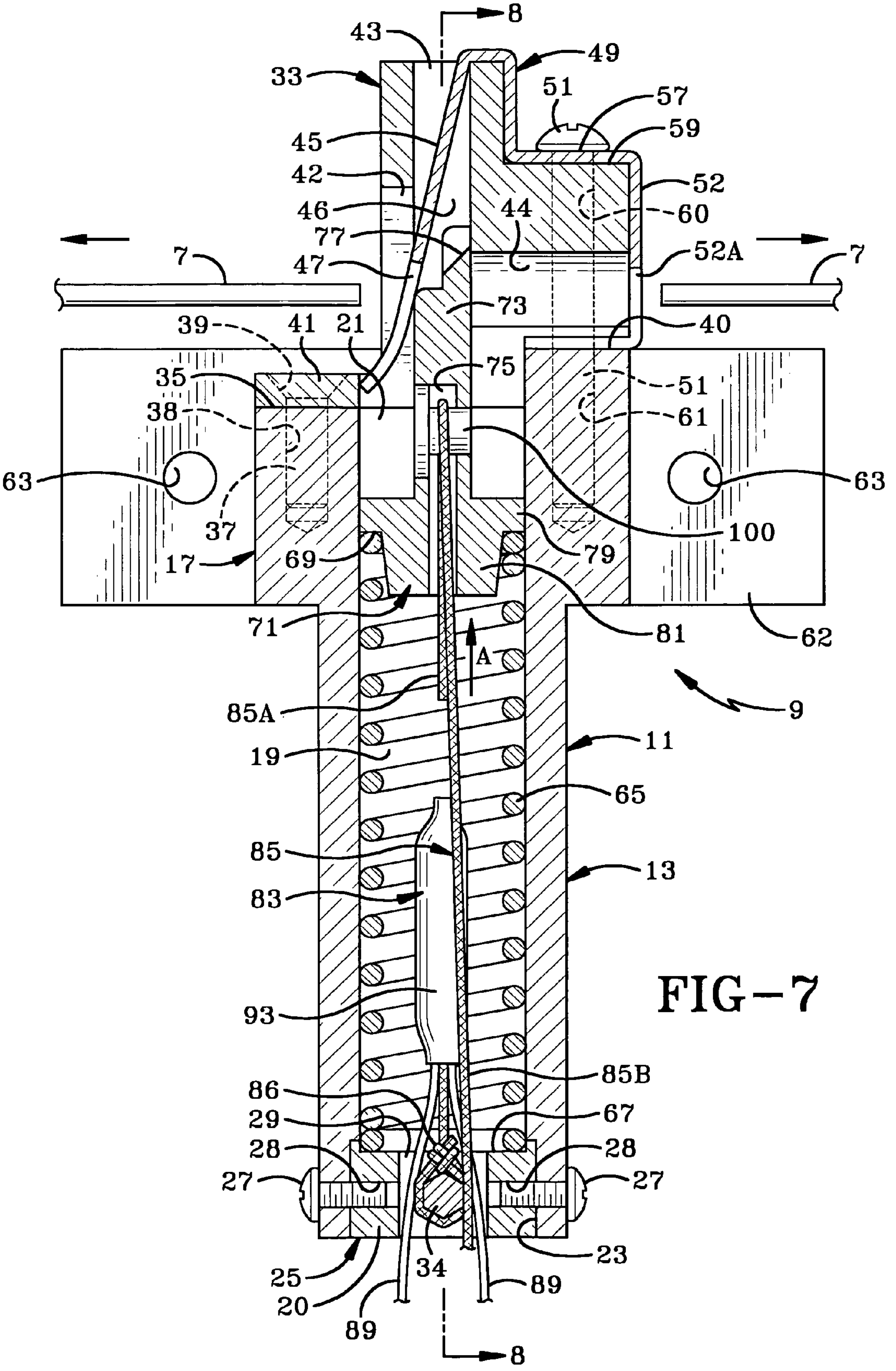
FIG. 7 is a sectional view similar to FIG. 5 after the cutting blade has severed the towline.
Figure 8:
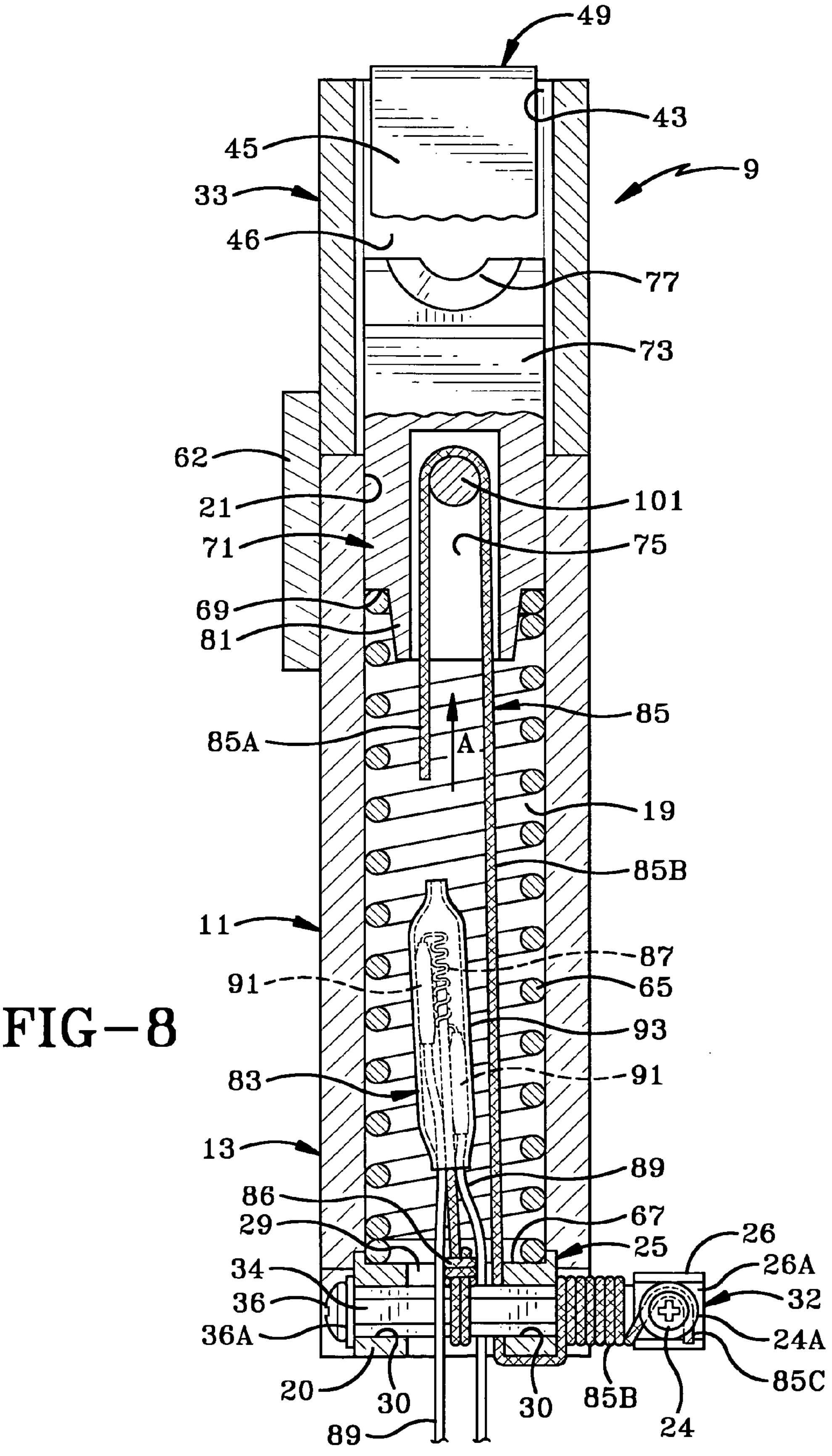
FIG. 8 is a sectional view taken on line 8-8, FIG. 7.

As shown in FIG. 5, upper end of spring 65 abuts against base 79 of cutting blade 71 and is retained therein by conical base portion 81 which extends into the interior of spring 65. Spring 65 is a compression coil spring which when loaded within housing 11 is in a compressed condition as shown in FIG. 5, and when released will extend to an at-rest extended position as shown in FIG. 7.

In accordance with one of the main features of the invention, a blade release mechanism indicated generally at 83, is mounted within the interior of spring 65 within bore 19 of housing 11 and is operatively connected between cutting blade 71 and housing 11. Release mechanism 83 functions as a thermal fuse in that, when subjected to a certain level of heat will separate disrupting the continuity of a retaining component thereof. Release mechanism 83 includes a cord 85 which can be formed of various types of material, preferably a meltable high strength polymer, a heat source provided by wrapping a portion of cord 85 with a heater wire 87, the ends of which are connected to a pair of electrical conductors 89 by connectors 91. Preferably connectors 91 and coiled heater wire 87 are protected within an outer sleeve 93 which could be a rigid plastic tubing or a heat shrink sleeve of plastic material as shown in the drawings to firmly encase and protect the coiled heater wire, adjacent cord and terminal connectors.

Electrical conductors 89 are connected to a power source 95 (FIG. 4) which is a source of electrical energy, preferably a DC voltage. An activation switch 97 preferably communicates in one or more of the electrical conductors, and when actuated either manually or remotely, will connect power source 95 to heater wire 87. How switch 97 is activated in order to supply power to heater wire 87 will vary depending upon the type of aircraft in which the severance apparatus 9 is installed and type of deployment system utilized in the aircraft. Cord 85 has a looped configuration with a pair of cord lengths 85A and 85B with heater wire 87 being shown wrapped about a portion of cord length 85A and with the free end thereof being connected to bolt shaft 34 by a knot 86, such as a Palomar knot. Cord 85 is looped about a pin 101 as shown in FIGS. 4-8, and connected to blade 71 by pin 101 extending through opening 75 of blade shaft 73 and through the upper loop end of cord 85 to connect the looped end of cord 85 to cutting blade 71.

Figure 6:
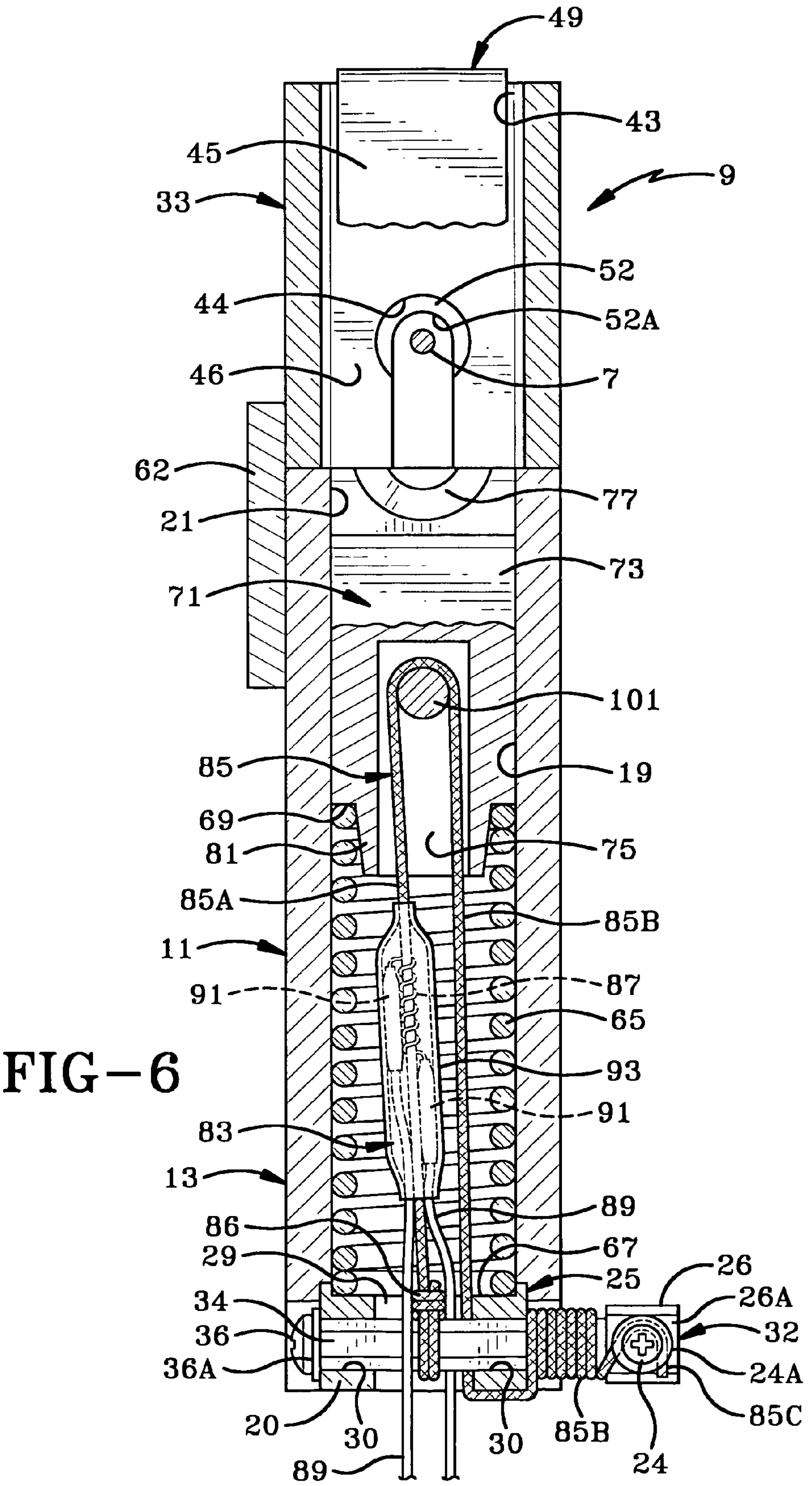
FIG. 6 is a sectional view taken on line 6-6, FIG. 5.

The free end of cord length 85B extends through central opening 29 of end closure member 25 and after compressing spring 65 to its loaded position as shown in FIGS. 5 and 6, is wrapped about smooth shaft portion 34B with its terminal end 85C being clamped against surface 26A by bolt 24 and washer 24A. This terminal connection of cord length 85B provides a secure termination preventing slippage of the cord which remains under constant tension until being actuated by melting cord length 85A.

FIG. 5 shows severance apparatus 9 in an assembled, loaded or active position wherein cord 85 is connected to lower capstan bolt 32 and to top pin 101. Cord 85 has a length so that after it secures spring 65 in a desired compression position wherein cutting edge 77 of cutting blade 71 is within bore 19 below the top opening 21 of housing top portion 17, it can be wrapped about capstan bolt 32. Towline 7 extends through U-shaped notches 47 and 52A of spring lever 45 and through front and back openings 42 and 44 respectively, of top housing cap 33. Immediately upon the occurrence of an event that requires towline 7 to be severed, switch 97 will be closed either manually or automatically. This will apply electrical power from power source 95 to heater wire 87 which immediately melts the encircled area of cord length 85A whereupon spring 65 will expand from its contracted or loaded position of FIG. 5 to a fully extended or expanded cutting engagement position as shown in FIG. 7. This expansion of spring 65 slides cutting blade 71 upwardly in the direction of Arrow A, FIG. 7, whereupon cutting edge 77 severs towline 7 as shown in FIG. 7. Spring lever 45 assists in the cutting operation of towline 7 especially if the towline is slack at the instant that cutting edge 77 engages the towline, and assists in maintaining the towline in the desired position for engagement by blade edge 77 even if the tension in the towline continually varies as it is being towed by aircraft 1.

Once the towline is severed by cutting blade 71, release mechanism 83 must be replaced which is accomplished by inserting pin 101 through the loop end of a new cord 85 and after collapsing spring 65 to its desired loaded position, tying off end 85C to capstan bolt 32 to form a new release mechanism 83, and then connecting conductors 89 to power source 95 and switch 97. Protective outer sleeve 93 assists in preventing the heat generated by the heater wire 87 and the rapid separation of the melted cord length 85A from being experienced externally by preventing the heat from the separated cord being exposed to the surrounding atmosphere causing possible safety issues, which could occur with pyrotechnic severing mechanisms.

In the preferred embodiment, cord 85 is a polymer cord, preferably a high modulus polyethylene such as sold under the trademark Spectra®, or could be a liquid crystal aromatic polyester such as sold under the trademark Vectran®. These are merely two examples of the types of meltable cord which can be used in release mechanism 83. These types of material are desirable in that they have an extremely high strength, low creep and a reasonable melting point. They also have sufficient high strength to maintain spring 65 in its loaded compressed position as shown in FIG. 5 over a considerable length of time without any appreciable creep so that the spring is able to supply its maximum biasing force against cutting blade 71 when cord 85 is separated upon electric power being applied to heater wire 87.

In the preferred embodiment, a 250 lb strength high modulus polymer cord 85 is utilized having a melting point of approximately 147° C. Heater wire 87 preferably is a 32 AWG nichrome wire which consists of 61% Ni, 15% Cr, bal. Fe, that is tightly wound around cord length 85A. To overcome difficulties of soldering the nichrome wire of heater wire 87 directly to the copper wire of conductors 89, terminal connectors 91 assist in achieving a good electrical connection. Electric power supply 95 preferably provides 28 VDC to heat wire 87. The pulse width of this activation voltage is controlled to provide sufficient energy to melt cord length 85A without developing temperatures high enough to be a safety concern. Successful testing has been conducted with a 0.075 second pulse width which provides the desired quick activation and separation of cord 85 without producing appreciable smoke.

Tests have also been done to show that a modified cutting blade 105 (FIG. 9) which has a planar angular cutting edge 107 may also be utilized for certain types of towlines 7 replacing cutting blade 71 having the concave cutting edge 77 therein as shown in FIG. 3A. Modified cutting blade 105 will have the same basic construction as does cutting blade 71 except for the type of cutting edge provided thereon. Furthermore, depending upon the type of cutting blade chosen, a chisel-type cutting blade could be used which would chop the blade against a flat anvil surface with the towline being cut against the anvil. However, it has been found that such a construction requires more energy than the angled cutting edge 107 of cutting blade 105 or the concave cutting edge 77 of blade 71.

Cutting blade 105 has proved highly successful in combination with spring clip 49 since when the blade pushes up against the towline, the towline is pushed against the clip that supports the towline on both sides of the blade as the blade cuts completely through the towline. This is especially effective even when the towline becomes slack at the moment the blade contacts the towline which can present a problem with some types of blades.

The cutter blade can have various other configurations such as straight, concave, angled, serrated, or even have multiple cutting surfaces such as a cookie cutter blade. The cylindrical cookie cutter blade would not have to be held in a specific rotary position like a single blade. However, a cookie cutter requires more energy since it cuts at two locations.

Furthermore, other types of terminations for cord ends 97 and 98 and their attachments to blade 71 and housing 13 can be utilized without affecting the concept of the invention.

It is also readily understood that severance mechanism 9 can be used for other applications with equal effectiveness than severing the towline of a towed decoy. For instance, it can be used for severing mooring cables, cutting parachute reefing lines and various types of control or communication wires. It could also be used to sever thin bars of materials which can be cut by using a selected type of compression spring and cutting edge. It also could be used to puncture an object such as a diaphragm to release a fluid for various purposes, by easily replacing cutting edge 77 with a more pointed configured blade such as blade edge 107, which will puncture a desired object.

Again, one of the main features of severance apparatus 9 is the use of a spring actuated cutting device or puncturing member which is released by applying electrical energy or a heat source to a meltable cord which retains the spring in a loaded position, avoiding the use of a pyrotechnic device as heretofore used in a many types of severing mechanisms. The apparatus of the present invention provides extremely rapid activation, that immediately upon the applying of the heat source to the meltable cord, the biasing force exerted by spring 65 in its compressed condition will immediately separate the cord upon it starting to melt by the wrapped heater wire. This type of mechanism avoids the resulting explosive-type effect that is caused by pyrotechnic devices. It also requires a relatively small amount of heat to melt the cord and requires only a small source of electric power, which is readily available in most apparatus in which the severing apparatus will be utilized, for heating the heater wire 87.

It is also readily understood that other types of severable retention material than that of cord 85 could be utilized with various types of applied heat sources than that described above, although it has been found that a meltable polymer cord in combination with the wrapped heater wire having a DC voltage source supplied thereto is the preferred construction, especially for the use of severance apparatus for use in an aircraft for severing a towing line.

In one embodiment, severance apparatus 9 will have a length of approximately 1.8 inches with housing 11 having an outer width of approximately 0.60 inches. Cutting blade 71 is formed of 440C stainless steel and will satisfactorily sever a 0.059 inch diameter towline such as described in U.S. Pat. No. 7,200,305.

The term “thermal fuse” as used herein means a thermal release device which includes a spring restraint that releases when melted due to applications of thermal energy or heat, such as a one-time fusible link which when subjected to heat will melt causing the release of a spring as shown in the drawings and described above.

The term “cable” as used herein can mean other types of lines or cables other than decoy towlines, such as mooring cables, parachute reefing lines, control or communication wires, and small solid rods or hollow tubing.

The severing mechanism also could be provided with various means for sealing the interior thereof, such as using an O-ring at cutter blade assembly 79 and an adhesive sealant or encapsulating material where conductors 89 exit bottom closure member 25. Also, the seal could vent once motion starts so that the entrapped air volume does not provide an additional resistance to the actuation motion. Sealing could provide some advantages in harsh environments, such as sand, dust, explosive atmosphere, etc.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A device for severing a towing cable extending between a towing vehicle and a towed object, said device comprising:

a housing;

a cutting blade mounted in the housing and moveable from a retracted position into an extended cutting engagement position with the cable, said housing having a cap mounted on one end and formed with a through passage for receiving the cable therethrough and a slotted spring clip located adjacent the through passage for trapping the cable therein;

a spring biasing the cutting blade toward the cutting engagement position with the cable; and a release mechanism for maintaining the cutting blade in the retracted position and then for releasing the cutting blade for movement into the cutting engagement position with the cable, said release mechanism including a meltable cord operatively connected to the cutting blade for maintaining the cutting blade in the retracted position and a heat source communicating with the cord for separating the cord by melting the cord whereupon the biasing force of the spring moves the blade into cutting engagement with the cable to sever the cable and release the towed object from the towing vehicle, said heat source including a heater wire contacting a portion of the cord and a DC power supply for heating the wire to melt said portion of the cord.

2. The severing device of claim 1 wherein the meltable cord is a high strength polymer cord.

3. The severing device of claim 2 wherein the polymer cord is a high modulus polyethylene or a liquid crystal polymer.

4. The severing device of claim 2 wherein the meltable cord is looped about a pin attached to the cutting blade to operatively connect one end of the cord to the cutting blade.

5. The severing device of claim 2 wherein the looped cord includes a pair of cord lengths extending between the cutting blade and an end closure member secured in the housing; in which the heater wire is wrapped around a portion of at least one of the cord lengths for melting said one cord length; and in which at least one of the cord lengths is secured to the end closure member with the other of said cord lengths passing through said end closure member and terminating about a capstan extending from the housing.

6. The severing device of claim 1 wherein the heater wire is wrapped around a portion of the cord to melt said portion of the cord.

7. The severing device of claim 6 wherein the heater wire is a nichrome wire coiled around the cord.

8. The severing device of claim 1 wherein the cutting blade has a concave cutting edge.

9. The severing device of claim 1 wherein the cutting blade has a straight angled cutting edge.

10. The severing device of claim 1 wherein the housing has a main body formed with a cylindrical bore; in which the spring is a coiled compression spring located within the housing bore; and in which the cutting blade has a cylindrical base having a diameter complementary to the diameter of the housing bore and is slidably mounted therein.

11. The severing device of claim 1 in which the heater wire and the portion of the cord in contact with the heater wire are contained within an outer protective sleeve.

12. The severing device of claim 11 wherein the outer protective sleeve is a heat shrink plastic sleeve.

* * * * *